United States Patent [19]

Staker

[11] 3,958,983

[45] May 25, 1976

[54] DECOMPOSITION OF CHALCOPYRITE

[75] Inventor: Walter Lyman Staker, Salt Lake City, Utah

[73] Assignee: The United States of America as represented by the Secretary of the Interior, Washington, D.C.

[22] Filed: June 19, 1975

[21] Appl. No.: 588,547

[52] U.S. Cl. .............................. 75/101 R; 75/109; 75/117; 75/121; 204/107
[51] Int. Cl.$^2$ .................. C22B 15/00; C22B 61/00
[58] Field of Search ............... 75/101 R, 117, 121, 75/109; 204/107, 108

[56] References Cited
UNITED STATES PATENTS

| | | | |
|---|---|---|---|
| 3,714,325 | 1/1973 | Bloom et al. | 75/121 X |
| 3,730,860 | 5/1973 | Horton et al. | 75/117 X |
| 3,857,767 | 12/1974 | Gabler et al. | 204/108 |

*Primary Examiner*—G. Ozaki
*Attorney, Agent, or Firm*—William S. Brown; Donald R. Fraser

[57] ABSTRACT

Chalcopyrite ore or concentrate is decomposed by reacting with an aqueous acid solution of a transition metal ion in a lower valence state, the metal being from the group consisting of chromium, vanadium and titanium.

6 Claims, No Drawings

DECOMPOSITION OF CHALCOPYRITE

U.S. patent application Ser. No. 543,208 discloses a process for decomposition of chalcopyrite ore or concentrate by reaction with an aqueous acidic solution and a metallic reducing agent. It has now been found, according to the present invention, that ions of the transition elements chromium, vanadium and titanium in their lower oxidation states are effective reducing agents in a process of the type disclosed in said application.

It has also been found, according to a further aspect of the present invention, that the above-mentioned ions may be used as catalysts, or intermediate reducing agents, in conjunction with the metallic reducing agents, or with an electric current, in the process of the invention. Use of the ions as a catalyst, in combination with a metallic reducing agent or electric current, results in a more efficient and economical use of either of the latter due to the more intimate contact between the reducing agent and the chalcopyrite.

The aqueous acidic solution consists essentially of a water solution of a mineral acid, preferably hydrochloric or sulfuric acid. Concentrations of about 10 to 35 percent acid are generally suitable. Hydrochloric acid in a concentration of about 12 to 25 percent HCl is particularly preferred. Optimum concentration of the acid will vary with the specific ore, acid and reducing agent, and the temperature of the reaction, and is best determined experimentally.

The ions that serve as reducing agents in the process of the invention are those of Cr, V or Ti, preferably in the plus-2 valence state. The lower valence state of the ions may be obtained by dissolvng the metal, or a suitable salt, in the acid solution, or by reducing higher valence states in acid solution with primary reducing agents such as elemental aluminum, iron, lead, etc., or by reduction by means of electrolysis in a diaphragm cell. Suitable sources of chromium ions are chromic acid, sodium chromate, chromous chloride, and metallic chromium. Suitable vanadium ion sources are vanadium pentoxide, vanadium oxychloride, sodium vanadate and vanadium metal. Titanium ion sources include titanium tetrachloride, titanium sulfate, titanium trichloride and titanium metal.

The chalcopyrite feed material may contain minor amounts, e.g., up to about 25 percent, of other minerals such as bornite, pyrite, covellite, chalcocite, and silicious gangue. It generally consists of a finely divided flotation concentrate having a particle size of about 65 percent minus 200-mesh. A slurry is prepared by dispersing the finely divided ore or concentrate in the aqueous acidic solution in an amount up to about 500 grams solids per liter of solution. Optimum solids content of the slurry will depend on the above-mentioned variables and is also best determined experimentally.

As a result of the improved efficiency of the process of the invention, temperatures of about 25° to 30°C are generally satisfactory, although higher temperatures, e.g., up to about 50°C, may give somewhat faster reaction rates. Atmospheric pressure is generally suitable, although pressures of about −10 psig to 5 psig may be used.

The decomposition reaction of the invention results in formation and evolution of hydrogen sulfide, which may be collected and marketed as such or converted to elemental sulfur by means of conventional processes. At the completion of the reaction, the residue and solution are separated by conventional liquid-solid separation techniques. The residue may contain copper, copper sulfide, precious metals, silicious gangue and unreacted concentrate, the exact types and amounts of products depending on the specific chalcopyrite ore or concentrate, transition metal ion and reaction conditions employed. The solution contains iron chloride, as well as soluble salts of other metals derived from the chalcopyrite or reagents employed in the reaction. Thus, the chalcopyrite is decomposed, with the copper reporting in the solid phase, the iron in the liquid phase and sulfur in the gas phase.

The iron in the leach solution may be recovered as ferrous chloride by chilling or by adding hydrogen chloride to the solution. The ferrous chloride may be electrolyzed to recover metallic iron, or it may be converted to ferric oxide with regeneration of hydrogen chloride.

The copper content of the residue is generally about 50 to 75 percent. Further refining for commercial applications is necessary. However, the product contains only small amounts of sulfur and can be melted and fire-refined without undue air pollution. An alternative method of treatment of the residue may be copper chloride or ammoniacal leaching and electrowinning to recover a commercial grade copper.

Typical reactions involved in the process of the invention are as follows:

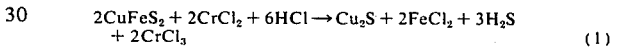
$$2CuFeS_2 + 2CrCl_2 + 6HCl \rightarrow Cu_2S + 2FeCl_2 + 3H_2S + 2CrCl_3 \tag{1}$$

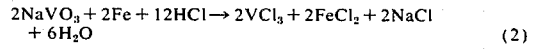
$$2NaVO_3 + 2Fe + 12HCl \rightarrow 2VCl_3 + 2FeCl_2 + 2NaCl + 6H_2O \tag{2}$$

$$2VCl_3 + Fe \rightarrow 2VCl_2 + FeCl_2 \tag{3}$$

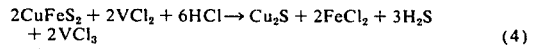
$$2CuFeS_2 + 2VCl_2 + 6HCl \rightarrow Cu_2S + 2FeCl_2 + 3H_2S + 2VCl_3 \tag{4}$$

The following examples will more specifically illustrate the process of the invention.

Examples 1–3 show the use of a reduced form of the transition metal ion in acid solution for selectively leaching iron and sulfur in chalcopyrite from the copper at ambient temperature and pressure, without the presence of other reducing agents.

EXAMPLE 1

Twenty grams of flotation chalcopyrite concentrate assaying, in percent, 26.5 Cu, 26.6 Fe, 30.9 S, and 10.0 insolubles was placed in a stoppered flask. One tube through the stopper was connected to a gas collection jar containing dilute sodium hydroxide solution. A second tube through the stopper was connected to the bottom of a column containing mossy zinc metal. Three hundred milliliters of a solution containing 130 milliliters concentrated hydrochloric acid (37 percent HCl) and 17 grams chromium trioxide ($CrO_3$-commerical chromic acid) in distilled water was run through the column of zinc. The yellow chromic chromium ($Cr^{6+}$) was reduced to the light blue chromous ($Cr^{2+}$) ion by the zinc. The reduced solution was collected in the flask containing the chalcopyrite concentrate. The slurry was mixed at room temperature and pressure for 10 minutes, then filtered, washed, and dried giving 10.63 grams of residue. The solution was run through the zinc column again and mixed with the residue for 20 minutes, filtered, and the residue washed and dried giving 10.00 grams of residue. The majority of the soluble iron and sulfur were dissolved in 10 minutes. The leach solution now contained the green chromic chromium ($Cr^{3+}$). The residue assayed, in percent, 50.0 Cu, 7.4 Fe, and 17.6 S. Eighty-six percent of the iron was dissolved and 72 percent of the sulfur evolved as hydrogen sulfide and collected in the sodium hydroxide solution.

EXAMPLE 2

Forty-six grams of vanadium oxychloride ($VOCl_2$) and 125 milliliters of 37-percent hydrochloric acid were diluted to 200 milliliters with distilled water and the red solution passed through the zinc column as in example 1. The reduced blue solution was collected and slurried with 20 grams of chalcopyrite concentrate. The slurry was mixed at room temperature and pressure for 15 minutes and filtered. The solution was run through the zinc column again and collected on the residue. The slurry was mixed 15 minutes, filtered, washed, and dried giving 10.09 grams. The residue assayed in percent 50.09 Cu, 6.1 Fe, and 19.8 S. Eighty-eight percent of the iron was dissolved and 68 percent of the sulfur evolved as hydrogen sulfide. The copper remained in the residue as chalcocite ($Cu_2S$).

EXAMPLE 3

To show it was the reduced form of the transition metal ions in examples 1 and 2 that aided in leaching iron and sulfur from chalcopyrite, 20 grams of concentrate, assaying in percent 25.9 Cu, 27.4 Fe, and 28.5 S, was stirred 20 hours in a solution containing 150 milliliters distilled water and 150 milliliters of 37-percent hydrochloric acid. The slurry was filtered and the residue washed and dried giving 16.5 grams assaying, in percent, 27.0 Cu, 27.1 Fe, and 32.7 S. 18.4 percent of the iron was dissolved and 5.3 percent of the sulfur evolved as hydrogen sulfide in 20 hours. Comparison of the alterations, based on the amount of iron dissolved, was nearly 90 percent with the transition metal ions and only 18 percent without them.

Examples 4, 5, and 6 show single stage electroreduction leaching with the transition metal ions being reduced by an electric current, and examples 7 and 8 show electroreduction leaching without the transition metal ions.

EXAMPLE 4

Twenty grams of the chalcopyrite sample used in example 1 was added to the cathode compartment of a three-compartmented horizontal electrolytic cell. The cell was divided by 8.46 ounces per yard 1/1 plain weave Teflon (polytetrafluoroethylene) filter cloth. Three hundred milliliters of 20-percent hydrochloric acid containing 32 grams hydrated chromic chloride ($CrCl_3.xH_2O$) was used as catholyte and 300 milliliters of 20-percent hydrochloric acid an anolyte. Copper sheet metal was used as cathode and carbon as anodes. The cathode compartment was covered to protect the solution from air. The catholyte was stirred slightly. Electrolysis was done at 16 amperes per square foot of cathode area for 10.26 ampere-hours at room temperature. A powdery deposit of 2.57 grams formed on the cathode assaying in percent 66.4 Cu, 59.7 Cu°, 2.4 Fe, and 5.37 S. Ninety percent of the cathode deposit was metallic copper. A residue of 2.22 grams was removed from the bottom of the cathode compartment assaying, in percent, 28.2 Cu, 24.0 Fe, and 30.6 S, which was essentially unchanged chalcopyrite. Ninety-nine percent of the iron was dissolved and 98 percent of the sulfur evolved as hydrogen sulfide from the altered chalcopyrite. Sixty-three percent of the copper in the altered chalcopyrite reported in the solution, and would have been precipitated as metallic copper with continued electrolysis.

EXAMPLE 5

Twenty grams of the chalcopyrite concentrate used in example 3 was added to the cathode (bottom) compartment of a two-compartmented vertical electrolytic cell. The cell was divided with Orlon (polyacrylonitrile) filter cloth. The catholyte solution was 200 milliliters of 20-percent hydrochloric acid containing 25 grams hydrated chromium chloride ($CrCl_3.xH_2O$). The anolyte solution was 20 percent-hydrochloric acid. Electrolysis was run 21.2 hours at 0.25 amperes and 0.7 volt (5.5 amperes per square foot of cathode area), then at 1 ampere and 1.5 volts for 3.6 hours (22 amperes per square foot of cathode area), or a total of 9.06 ampere-hours. The catholyte residue of 6.06 grams assayed, in percent, 67.1 Cu, 65.0 Cu°, 2.4 Fe, and 3.46 S. A 1.62-gram residue of unaltered chalcopyrite was in the anode compartment. Ninety-seven percent of the copper in the cathode deposit was metallic copper. Power requirements were about 1.1 kilowatt hours per pound of metallic copper produced and 0.228 kilowatt hours per pound of chalcopyrite treated. Eighty-nine percent of the iron was dissolved and 88 percent of the sulfur evolved as hydrogen sulfide.

EXAMPLE 6

Twenty grams of the chalcopyrite used in example 3 was added to the cathode compartment of a two-compartmented vertical electrolytic cell. Sodium vanadate ($NaVO_3$) was dissolved in 20-percent hydrochloric acid and used as both catholyte and anolyte. Electrolysis was run at 6 amperes (133 amperes per square foot of cathode area) and 3.2 volts for 1 hour without agitation. The cathode deposit of 8.88 grams assayed, in percent, 60.5 Cu, 15.1 Cu°, 2.7 Fe, and 14.4 S. Ninety-six percent of the iron was dissolved and 77 percent of the sulfur evolved as hydrogen sulfide.

The chalcopyrite was altered to a simple copper sulfide at ambient temperature with a power requirement of 0.435 kilowatt hour per pound of chalcopyrite treated.

For comparison, examples 7 and 8 show electroreduction leaching of chalcopyrite without the transition metal ions.

EXAMPLE 7

Twenty grams of the chalcopyrite used in example 3 were placed in the cathode compartment of a vertical two-compartmented cell. Twenty percent hydrochloric acid was used as both catholyte and anolyte. Electrolysis time was 22.95 hours at 0.25 amperes and 0.75 volt, then at 1 ampere and 1.5 volt for 3.62 hours for a total of 9.7-ampere hours and a power consumption of 0.221 kilowatt hours per pound of chalcopyrite treated. The catholyte residue of 10.65 grams assayed, in percent, 46.3 Cu, 19.4 metallic copper, 14.2 Fe, and 19.8 S. Seventy-two percent of the iron was dissolved and 64 percent of the sulfur evolved as hydrogen sulfide. A 72-pecent conversion of chalcopyrite to simple copper sulfide was obtained compared with 89 percent conversion with the transition metal ions under the same conditions, as shown in example 5.

EXAMPLE 8

Twenty grams of the chalcopyrite used in example 5 was placed in the cathode compartment of a two-compartmented vertical cell. A solution consisting of 150 grams hydrated ferrous chloride ($FeCl_2 \cdot 4H_2O$) diluted to 1 liter with 20 percent hydrochloric acid was used as both catholyte and anolyte. Electrolysis was carried out at 0.25 amperes and 0.75 volt for 16.4 hours, then 6 amperes and 3.2 volts for 1 hour. The catholyte residue of 11.64 grams assayed, in percent, 46.0 Cu, 13.0 metallic copper, 14.8 Fe and 21.6 S. Sixty-nine percent of the iron was dissolved and 58 percent of the sulfur evolved as hydrogen sulfide. The conversion to simple copper sulfide was 20 percent less than with the transition metal ions.

In examples 9 and 10 a metallic reducing agent was added to a mixture of chalcopyrite concentrate and an acidic solution of the transition metal ion.

EXAMPLE 9

Five grams of chalcopyrite concentrate, assaying in percent, 26.5 Cu, 26.6 Fe, and 30.95 S, and 2.5 grams of metallic copper were added to a solution containing 20 percent hydrochloric acid and 15 grams per liter vanadium oxychloride. While agitating this slurry at room temperature (25°C), 2.6 grams of shredded detinned, can scrap were added over a period of 5 hours. The residue was separated from the slurry by filtration and further processed by leaching in ammoniacal-ammonium carbonate solution at room temperature. The leached residue of 1.14 grams assayed 6.75 percent copper (0.077 gram of Cu); thus 94.2 percent of the copper contained in the chalcopyrite and all the copper powder added was recovered in the ammoniacal solution and was separated from iron and sulfur.

EXAMPLE 10

Twenty grams of chalcopyrite was added to 300 ml of solution containing 20 percent hydrochloric acid and 6 grams of $TiCl_3$. Four grams of aluminum shot were added over a period of 3 hours at room temperature. After the aluminum was dissolved, the solution was heated to 40°C to drive $H_2S$ from the solution. The slurry was filtered, washed, and dried giving 11.09 grams of residue assaying, in percent, Cu 48.3, Fe 8.6, and S 22.2. Eighty-three percent of the iron was dissolved and 60 percent of the sulfur evolved as hydrogen sulfide.

I claim:

1. A process for decomposition of chalcopyrite ore or concentrate comprising reacting the ore or concentrate with an aqueous acid solution of a transition metal ion in a lower valence state, said metal being from the group consisting of chromium, vanadium and titanium.

2. The process of claim 1 in which the aqueous acid solution is a hydrochloric acid solution.

3. The process of claim 1 in which the aqueous acid solution is a sulfuric acid solution.

4. The process of claim 1 in which the transition metal ion has a valence of plus-2.

5. The process of claim 1 in which the lower valence state of the transition metal ion is attained by reduction of the transition metal ion in a higher valence state by means of a metallic reducing agent.

6. The process of claim 1 in which the lower valence state of the transition metal ion is attained by means of an electric current.

* * * * *